Oct. 17, 1967  E. W. STRONG ETAL  3,347,095
ATMOSPHERIC STATIC PRESSURE DETECTION MEANS
Filed Feb. 9, 1965  2 Sheets-Sheet 2

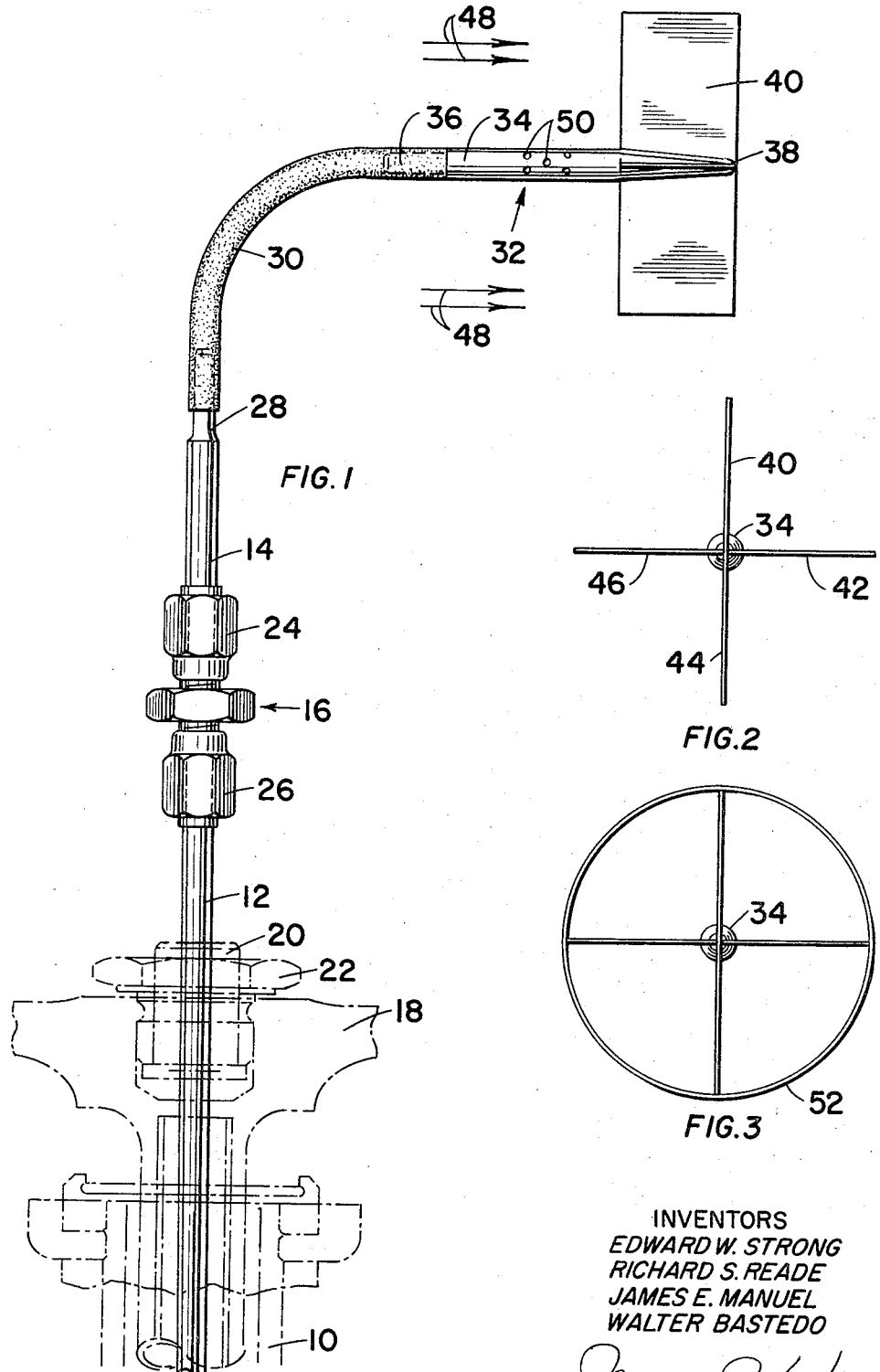

INVENTORS
EDWARD W. STRONG
RICHARD S. READE
JAMES E. MANUEL
WALTER BASTEDO

*James J. Wood*
ATTORNEY

United States Patent Office 3,347,095
Patented Oct. 17, 1967

3,347,095
**ATMOSPHERIC STATIC PRESSURE
DETECTION MEANS**
Edward W. Strong, Stony Brook, Richard S. Reade, Setauket, James E. Manuel, Belle Terre, and Walter Bastedo, Stony Brook, N.Y., assignors to Gyrodyne Company of America, Inc., St. James, N.Y., a corporation of New York
Filed Feb. 9, 1965, Ser. No. 431,320
13 Claims. (Cl. 73—178)

ABSTRACT OF THE DISCLOSURE

A static pressure measuring device for an aircraft having a static pressure detector element interconnected with a rigid tube element by means of a flexible resilient tube of predetermined flexibility and resiliency. Radially outwardly extending vanes are attached to the static pressure detector element to allow this latter element to align properly with the true direction of air flow. A cylindrical shroud enclosing the vanes has been found to further aid the alignment of the static pressure detector element with the ambient air flow. A planar air deflection means is secured at right angles to the rigid tube element to provide a substantially quiescent environment for the static pressure tube element under conditions of flight known as no wind hover at ground effect.

---

This invention relates to an improved atmospheric static pressure detection means, and more specifically to static pressure pick-up devices for use in connection with aircraft, especially helicopters.

In the operation of helicopters and other aircraft it is frequently necessary to have an accurate measurement of the environmental static air pressure, in order to determine the altitude of the aircraft. Static air pressure is conventionally "picked-up" or detected by means of a device mounted on the aircraft, comprising an elongated tube closed at one end, and having a plurality of apertures normal to the longitudinal axis of the tube. However, as a result of the motion of an aircraft through the air, the resulting airflow over these apertures will frequently be inclined to the longitudinal axis of the tube, so that a spurious differential dynamic component of pressure is introduced thereby adversely affecting the true static pressure reading. The problem is particularly serious with static pressure pick-ups for helicopters because of the fact that a helicopter is capable of movement in a variety of different directions, so that the conventional static pressure pick-up device is often disposed angularly with respect to the direction of the air stream, resulting in local turbulence in existing flow velocities over the static tube. In general, whenever the direction of air flow over a static pressure pick-up tube is not parallel to the longitudinal axis of that tube, a spurious reading is obtained.

In accordance with one preferred embodiment of the invention, there is provided a static pressure pick-up device which comprises a static pressure tube element, a rigid tube element leading to a manometer or other pressure indicating device, and a flexible resilient tube element interconnecting the static pressure tube element with the rigid tube element, this flexible connection being advantageously in the form of rubber tubing of a predetermined flexibility and resiliency.

In addition to being connected to the flexible resilient tube element at one end, the static pressure tube element may be provided at its opposite end with stabilizing or flow aligning fins or vanes. The flexible connection has a flexibility and resiliency such that it approximately counterbalances the weight of the static pressure tube element with its associated fins, and permits the static pressure tube elements to align itself with the instantaneous air flow so that the static pressure tube will always be balanced in a position which is substantially parallel to the direction of movement of the instantaneous air stream regardless of the direction of movement of the aircraft or helicopter through the air.

In accordance with another preferred embodiment there is provided a static pressure pick-up device which comprises a static pressure tube element, a rigid tube element leading to a manometer or other pressure indicating device, and a flexible resilient tube element interconnecting the static pressure tube element with the rigid tube element, the static pressure tube element at its free end being provided with stabilizing or flow aligning fins or vanes. An air deflector member is secured at right angles to the rigid tube element, so as to provide a substantially quiescent environment for the static pressure tube element under conditions of flight known as no wind hover at ground effect.

Accordingly, it is an object of this invention to provide an improved atmospheric static pressure detection means which will accurately measure static pressure regardless of the instantaneous aircraft attitude.

Another object of this invention is to provide an improved atmospheric static pressure detection means which will accurately measure static pressure during conditions of no wind hover at ground effect during helicopter operation at low altitudes.

The novel features which are believed to be characteristic of this invention are set forth with particularlity in the appended claims. The invention itself however, both as to its organization and method of operation, together with further objects and advantages thereof, may best be understood by reference to the following description, taken in connection with the accompanying drawings in which:

FIG. 1 is a front view of one illustrative embodiment of the present invention, showing a typical mounting in association with a helicoptor rotor;

FIG. 2 is a right side view of the static air pressure pick-up means of the invention as illustrated in FIG. 1;

FIG. 3 is a right side view similar to that of FIG. 2 depicting a modified embodiment of the pick-up device of the invention;

Figure 5:
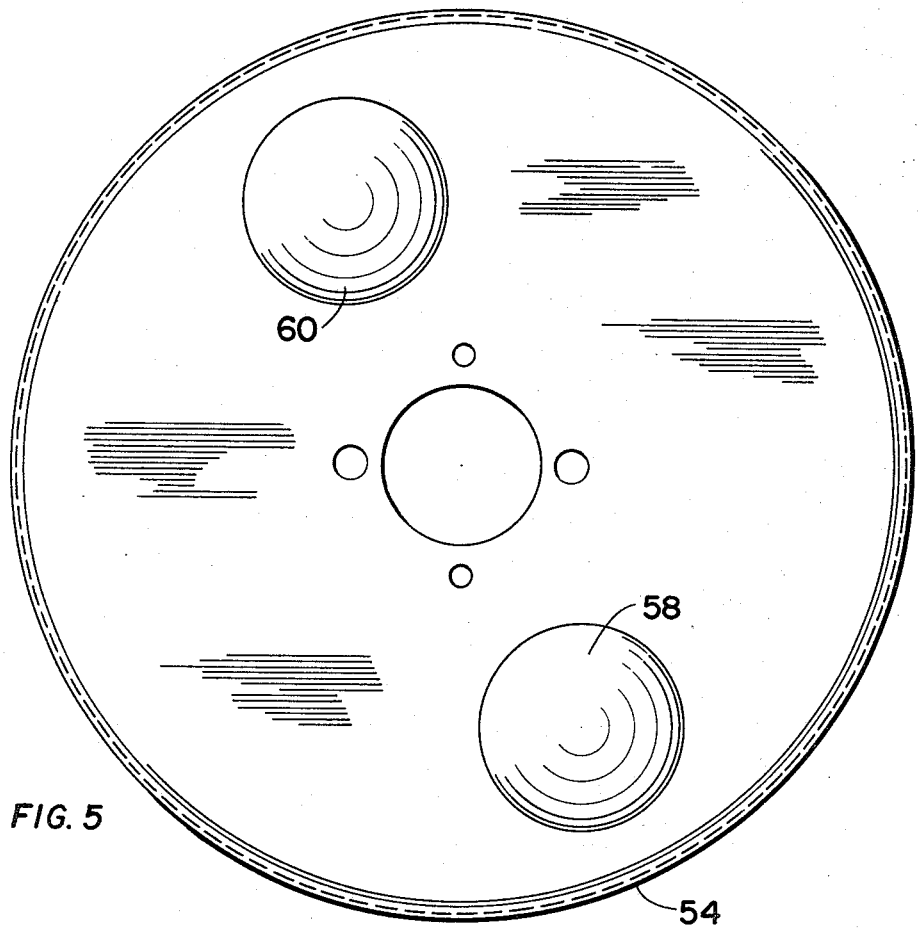
FIG. 5 is a top view of the air deflector means utilized in the embodiment of FIG. 4.

Referring now to FIGURE 1, there is shown a hollow rotor shaft 10, adapted to support and drive the rotor blades (not shown) of a conventional helicopter. The construction of the helicopter forms no part of the instant invention, and accordingly it will not be shown in great detail. A rigid tube element comprises two conduits 12 and 14, suitably joined together by means of a union indicated generally at 16. The conduit line 12 passes axially and nonrotatingly through the hollow rotor shaft 10 and is supported on an actuatting horn member 18 by means of a bushing 20 and nut 22. The line or conduit 12 conveys the static pressure of the environmental atmosphere to a static pressure indicator, altimeter or other instrument (not shown) located at some convenient point within the helicopter.

The rigid tube element (unnumbered) may be made integral if desired; however, it has been found convenient to form the rigid tube element of two conduits joined in fluid tight arrangement by means of the union 16 and nuts 24, 26 in order to facilitate maintenance and assembly.

The union 16 is appropriately threaded at each end, as are the cooperating opposing ends of conduits 14, 16, so as to receive nuts 24, 26 to perfect the fluid tight connection. The other end of conduit 14 includes a reduced diameter portion 28 adapted to receive one end of a flexible resilient tube element 30 which is connected thereto by means of a suitable adhesive. Similarly connected to the other end of the resilient tube element 30 is a static pressure tube element, indicated generally at 32 having a body portion 34 with a reduced diameter portion at one end 36 and adapted for connection to the flexible resilient tube element 30 by means of a suitable adhesive. The other end 38 of the body portion 34 is generally tapered as shown, and may be seen in FIGURES 1 and 2 is provided with a plurality of radially extending aerodynamic aligning fins or vanes 40, 42, 44, 46 which serve to align the static pressure tube element parallel with the environmental air stream. For purposes of illustration, a direction of air flow is assumed to be as indicated by the arrows 48. The body 34 is provided with a plurality of orifices 50 extending through the body 34 at right angles to its longitudinal axis, and are adapted to admit air at static pressure. The static pressure tube element may be fabricated from any suitable material such as metal or plastic.

The static air pressure pick-up device of this invention thus comprises: a rigid tube element or connection to the aircraft, illustrated by 12, 14, 16, a static pressure tube element illustrated at 32, and a flexible resilient tube element 30 interconnecting these two rigid elements: 12, 14, 16, 32. As previously mentioned, the flexible tube element as illustrated by the tube 30, has a flexibility such that the tube 30 bends under the weight of the static pressure tube element 32, with its associated fins 40, 42, 44, 46, but is sufficiently resilient as to counteract the combined weight of the static pressure tube element and fins. Under static conditions the flexible tube 30 bends over so that the static pressure tube element lies approximately horizontal, for example within about 30° of a horizontal plane. When the aircraft is in horizontal flight, the static pressure tube element 32 is directed by the vanes 40, 42, 44, 46 so as to align itself with the direction of the resulting air stream indicated by the arrows at 48. Likewise when the aircraft, e.g. the helicopter, changes its direction of movement from horizontal to the oblique or the vertical, the flexible element 30 permits the static pressure tube element 32 to adjust itself to the new attitude of the aircraft so that it reaches dynamic equilibrium in a plane substantially parallel to the direction of air flow regardless of the then attitude of the aircraft. Thus, when the aircraft moves vertically downwardly, the flexible tube element 32 will permit the static pressure tube element 32 to lie with its free end directed substantially vertically upwardly. On the other hand, when the aircraft moves vertically upwardly, the flexible tube permits the static pressure tube to adjust itself automatically into a position in which it points substantially vertically downwardly. The flexible tube element 30 can be formed from any convenient material having sufficient flexibility to permit the static pressure tube element to align itself with the direction of air flow and sufficient resilience to approximately counterbalance the weight of the static tube element so that the latter tends to "float" and conforms to the air flow without material influence by gravity. The flexible tube 30 further serves to isolate the static pressure tube element 32 from any vibration or dynamic shocks generated in the aircraft. Rubber, either natural or synthetic, is most suitably used for the construction of tube 30, but it will be understood that the invention is in no way limited to this material. The tube can be formed solely from rubber or other flexible material, or it can be provided with wire, fiber or fabric reinforcement, either as a lining or outer shell or embedded within the body of the tube, as is conventional in the manufacture of tubing from rubber or like materials. In any case, the tube 30 is selected in relation to the static pressure tube element 32 with which it is to be utilized so that it will counteract the weight of the tube. The accomplishment of this result is, of course, subject to several variables such as the length of the tube 32, the thickness of its wall, the composition of its wall, the nature of the material from which it is formed, and the like. In accordance with this invention it will present no difficulty to a person skilled in the art, to provide the various combinations of these variables which will result in a tube having the resiliency and flexibility characteristics specified above. In a typical illustrative embodiments, utilizing a static pressure tube unit 32 having an overall length of 3 in. and a total weight of .025# (including the weight of the vanes), the flexible tube element 30 has a length of 3⅜ in., a wall thickness of 0.05 in. and is formed from a homogeneous natural rubber composition.

It will be understood that various changes and modifications can be made in the embodiment described above without departing from the invention as defined in the appended claims. Thus, as shown in FIGURE 3, the fins or vanes 40, 42, 44, 46 on the free end of the static pressure tube element may be enclosed by a cylindrical shroud 52, and the number of fins may be other than four, e.g. three or five.

In helicopter operations under conditions described as "no wind hover in ground effect," the embodiment shown in FIGURES 1 and 2 does not function satisfactory because of the reverse flow of turbulent air up the rotor mast, which causes the static pressure tube element to detect the varying dynamic pressures in addition to the static pressures, thereby resulting in erroneous readings. (By definition, a "no wind hover in ground effect" is flight at an altitude between zero and one rotor diameter above the ground, with zero airspeed in every direction.) As a result of the spurious readings caused by the upward flow of turbulent air, the configuration shown in FIGURES 1 and 2 is unsatisfactory for sensing static pressure under these conditions; it has been found that the arrangement shown in FIGURES 4 and 5 may be advantageously utilized.

Figure 4:
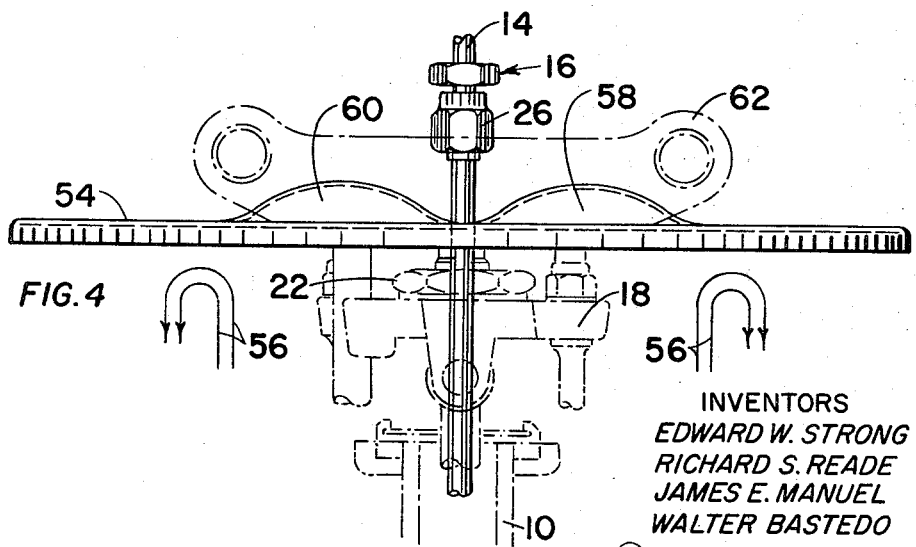
FIG. 4 is a front view of the invention in accordance with another illustrative embodiment of the invention.

In FIGURE 4, an air deflector means 54 is suitably supported just below the static pressure tube element. In the practical embodiment here illustrated, the air deflector means 54 is supported on the actuating horn member 18. The member 54 is of sufficient area to deflect the rising air stream as illustrated at 56, thus isolating the static pressure tube element from the turbulent air. Thus the static pressure tube element is free to register static pressure by virtue of the substantially quiescent air environment provided above the air deflector means 54.

In the top view of the practical embodiment air deflector means 54, shown in FIGURE 5, there are circular elevated portions 58, 60 in the otherwise planar member 54. These elevated portions 58, 60 are in no wise critical in the practice of the invention but are merely provided to permit free vertical displacement of certain linkages which form no part of this invention. The central hoisting fitting 62 is utilized for securing a lifting cable means to the helicopter.

It will be understood that the several features of the different embodiments are mutually interchangeable and that the invention is in no way limited to the embodiments shown by way of example in the drawing.

Obviously many modifications and variations of the present invention are possible in the light of the above teachings. It is therefore to be understood that within the scope of the appended claims the invention may be practiced other than as specifically described and illustrated.

We claim:
1. In combination with the rotor shaft of a helicopter,
 (a) a tube extending upwardly through said rotor shaft, said tube element terminating in a rigid tube element extending above the rotor shaft,
 (b) a static pressure tube element,

(c) a flexible resilient tube element interconnecting said rigid tube element and said static pressure tube element, said flexible tube element having a predetermined flexibility and resiliency such that said flexible tube element will hold said static pressure tube element with its axis in a substantially horizontal position when said aircraft is at rest.

2. The combination according to claim 1 comprising,
(d) a substantially planar air deflection means secured at right angles to said rigid tube element in proximity to said static pressure tube element.

3. In combination with the rotor shaft of a helicopter,
(a) a tube extending upwardly through said rotor shaft, said tube element terminating in a rigid tube element extending above the rotor shaft,
(b) a static pressure tube element having first and second end portions, the first end portion of said static pressure tube element being provided with radially-outwardly extending vanes,
(c) a flexible resilient tube element interconnecting said rigid tube element and said static pressure tube element and said static pressure tube element, said flexible tube element having a predetermined flexibility and resiliency such that said flexible tube element will hold said static pressure tube element with its axis in an approximately horizontal position when said aircraft is at rest and said rigid tube elements extends vertically upwardly.

4. The combination according to claim 3 comprising,
(d) a substantially planar air deflection means secured at right angles to said rigid tube element in proximity to said static pressure tube element.

5. In combination with the rotor shaft of a helicopter,
(a) a tube extending upwardly through said rotor shaft, said tube element terminating in a rigid tube element extending above the rotor shaft,
(b) a static pressure tube element having first and second end poritons, said first end portions of said static pressure tube element being provided with radially-outwardly extending vanes,
(c) a cylindrical shroud enclosing said vanes,
(d) a flexible tube element interconnecting said rigid tube element and the second end portion of said static pressure tube element, said flexible tube element having a predetermined flexibility and resiliency such that said flexible tube element will hold said static pressure tube element with its axis in an approximately horizontal position when said aircraft is at rest and said rigid tube element extends vertically upwardly.

6. The combination according to claim 5 comprising,
(e) a substantially planar air deflection means secured at right angles to said rigid tube element in proximity to said static pressure tube element.

7. A static air pressure pick-up device for an aircraft comprising, in combination,
(a) a rigid tube element adapted to be secured to the aircraft,
(b) a static pressure tube element having first and second end portions, the first end portion of said static pressure tube being provided with radially-outwardly extending vanes,
(c) a flexible resilient tube element interconnecting said rigid tube element and said second end portion of said static pressure tube element, said flexible tube element having a predetermined flexibility and resiliency such that said flexible tube element will hold said static pressure tube element with its axis in an approximately horizontal position when said aircraft is at rest, and
(d) a substantially planar air deflection means secured at right angles to said rigid tube element in proximity to said static pressure tube element.

8. A static air pressure pick-up device for an aircraft comprising, in combination,
(a) a rigid tube element adapted to be secured to the aircraft,
(b) a static pressure tube element having first and second end portions, the first end portion of said static pressure tube being provided with radially-outwardly extending vanes,
(c) a cylindrical shroud enclosing said vanes,
(d) a flexible resilient tube element interconnecting said rigid tube element and said static pressure tube element and having a predetermined flexibility and resiliency such that said flexible tube element will hold said static pressure tube element with its axis in a substantially horizontal position when said aircraft is at rest, and
(e) a substantially planar air deflection means secured at right angles to said rigid tube element in proximity to said static pressure tube element.

9. In combination with an aircraft,
(a) a tube extending upwardly from the aircraft and terminating in a rigid tube element extending upwardly above the associated portion of the aircraft,
(b) a static pressure tube element having first and second end portions, said first end portion being provided with radially-outwardly extending vanes,
(c) a flexible tube element interconnecting said rigid tube element and the second end portion of said static pressure tube element, said flexible tube element having a predetermined flexibility and resiliency such that said flexible tube element will hold said static pressure tube element with its axis in an approximately horizontal position when said aircraft is at rest and said rigid tube element extends vertically upwardly, and
(d) a substantially planar air deflection means secured at right angles to said rigid state element in proximity to said static pressure tube element.

10. A static air pressure pick-up device for an aircraft, comprising,
(a) a rigid tube element adapted to be secured to the aircraft,
(b) a static pressure tube element having first and second end portions, said first end portions of said static pressure tube element being tapered and being provided with directional vanes for aligning said static pressure tube element with the surrounding air flow over said static pressure tube element, said static pressure tube having substantially radial holes through its tubular wall,
(c) a flexible resilient tube of elastomeric material interconnecting said rigid tube element and said static pressure tube element, said flexible tube having a selected flexibility and resiliency to counteract the weight of said static pressure tube and permit said static pressure tube element to be aligned by said vanes with the direction of airflow, and
(d) a substantially planar air deflection means secured at right angles to said rigid tube element in proximity to said static pressure tube element.

11. A static air pressure pick-up device for an aircraft, comprising,
(a) a rigid tube element adapted to be secured to the aircraft,
(b) a static pressure tube element having first and second end portions, said first end portions of said static pressure tube element being tapered and being provided with directional vanes for aligning said static pressure tube element with the surrounding air flow over said static pressure tube element, said static pressure tube having substantially radial holes through its tubular wall,
(c) a flexible resilient tube of elastomeric material interconnecting said rigid tube element and said static pressure tube element, said flexible tube having a selected flexibility and resiliency to counteract the weight of said static pressure tube and permit said static pressure tube element to be aligned by said vanes with the direction of airflow, and (d) a flat circular member secured at right angles to said rigid tube element in proximity to said static pressure tube element.

12. A static air pressure pick-up device for an aircraft comprising, in combination,
   (a) a rigid tube element adapted to be secured to the aircraft,
   (b) a static pressure tube element,
   (c) a flexible resilient tube element interconnecting said rigid tube element and said static pressure tube element, said flexible tube element having a predetermined flexibility and resiliency such that said flexible tube element will hold said static pressure tube element with its axis in an approximately horizontal position when said aircraft is at rest and said rigid tube element extends vertically upwardly, and
   (d) a substantially planar air deflection means secured at right angles to said rigid tube element in proximity to said static pressure tube element.

13. In combination with an aircraft,
   (a) a tube extending upwardly from the aircraft and terminating in a rigid tube element extending upwardly above the associated portion of the aircraft,
   (b) a static pressure tube element,
   (c) a flexible tube element interconnecting said rigid tube element and said static pressure tube element, said flexible tube element having a predetermined flexibility and resiliency such that said flexible tube element will hold said static pressure tube element with its axis in an approximately horizontal position when said aircraft is at rest and said rigid tube element extends vertically upwardly, and
   (d) a substantially planar air deflection means secured at right angles to said rigid tube element in proximity to said static pressure tube element.

References Cited

UNITED STATES PATENTS

| | | | |
|---|---|---|---|
| 2,524,747 | 10/1950 | Ayres et al. | 73—178 |
| 2,554,634 | 5/1951 | Paine et al. | 73—212 |
| 2,650,497 | 9/1953 | Renwanz | 73—212 |
| 2,662,402 | 12/1953 | Ince et al. | 73—212 X |
| 2,671,620 | 3/1954 | Andrews | 73—182 X |
| 3,149,491 | 9/1964 | Sissenwine et al. | 73—178 |

LOUIS R. PRINCE, *Primary Examiner.*

D. O. WOODIEL, *Assistant Examiner.*